United States Patent [19]

Inoue et al.

[11] Patent Number: 4,686,863
[45] Date of Patent: Aug. 18, 1987

[54] ROTARY ACTUATOR

[75] Inventors: Masaru Inoue; Masao Ida, both of Kanagawa; Takao Kohara, Tokyo, all of Japan

[73] Assignees: Tokico Ltd.; Jidosha Denki Kogyo Kabushiki Kaisha, both of Kanagawa, Japan

[21] Appl. No.: 824,965

[22] Filed: Jan. 31, 1986

[30] Foreign Application Priority Data

Feb. 8, 1985 [JP] Japan .......................... 60-16600[U]
Jun. 20, 1985 [JP] Japan .......................... 60-93331[U]

[51] Int. Cl.[4] ......................... F16H 1/16; F16F 9/46
[52] U.S. Cl. ........................................ 74/425; 74/434; 188/299; 251/129.12
[58] Field of Search .................. 74/425, 434, 424.5, 74/458, 445, 427; 188/299, 285; 251/209, 129.12; 192/142 R; 318/673, 672

[56] References Cited

U.S. PATENT DOCUMENTS

| 1,156,233 | 10/1915 | Johansson | 74/425 |
| 2,569,744 | 10/1951 | Cecka | 74/425 |
| 2,905,776 | 9/1959 | Eisenberg et al. | 74/425 |
| 3,007,346 | 11/1961 | Demuth | 74/427 |
| 3,152,488 | 10/1964 | Sergan | 74/427 |
| 3,282,557 | 11/1966 | Capps | 251/129.12 |
| 3,447,392 | 6/1969 | Kawchitch | 74/411 |
| 4,282,767 | 8/1981 | Guichard | 74/427 |
| 4,527,676 | 7/1985 | Emura et al. | 188/299 |

FOREIGN PATENT DOCUMENTS 3537023 4/1986 Fed. Rep. of Germany ...... 188/299

Primary Examiner—Cornelius J. Husar
Assistant Examiner—Peter M. Cuomo
Attorney, Agent, or Firm—Wenderoth, Lind & Ponack

[57] ABSTRACT

A rotary actuator comprising a first rotor rotatable around a first axis and an axial end surface with a plurality of circumferentially spaced and axially projecting first projections, attending therefrom a second rotor rotatable around a second axis which is not coincident with the first axis, the second rotor having an axial end surface with a plurality of circumferentially spaced and axially projecting second projections extending therefrom, and a rotating mechanism being connected to the second rotor to rotate it around the second axis. The second projections project in a direction opposite to that of the first projections to cooperate therewith such that either one of the second projections engages with either one of the first projections to rotate the first rotor through a predetermined angle.

12 Claims, 13 Drawing Figures

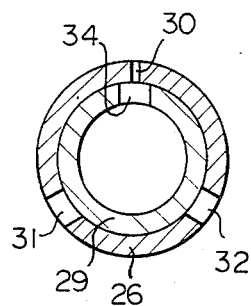
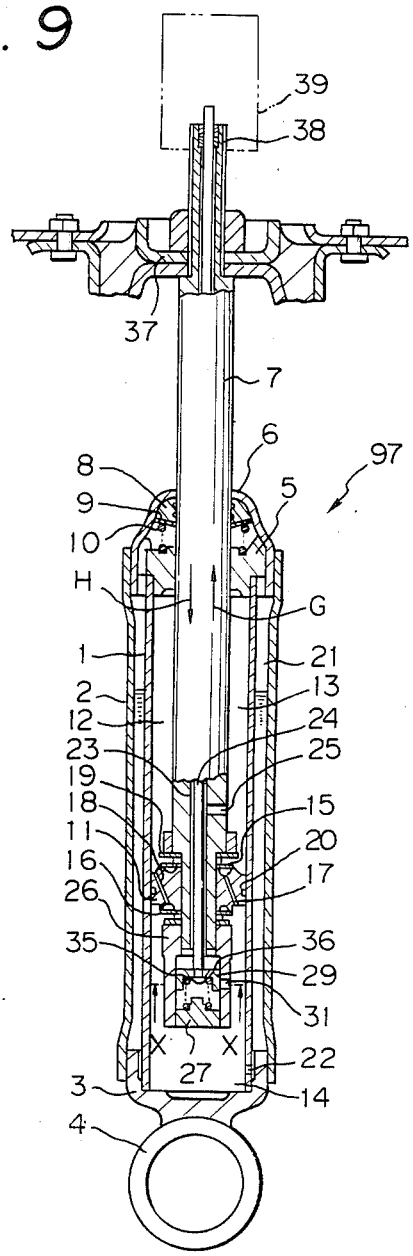

ROTARY ACTUATOR

BACKGROUND OF THE INVENTION

This invention relates to a rotary actuator, particularly adapted for use in a device for driving a damping force adjusting mechanism of a hydraulic damper.

In adjusting the damping force of a hydraulic damper incorporated in a vehicle such as an automobile, to accommodate with the driving conditions, the conditions of the road and the like, a damping force adjusting mechanism is provided in the hydraulic damper. The damping force adjusting mechanism usually comprises a driving device for rotating an adjusting member which adjusts the opening of a liquid passage. Heretofore, a device including a rack and pinion mechanism for transferring the motion of a reciprocally movable solenoid to a rotating motion, a rotary actuator including a geared electric motor or the like has been used as the driving device for attaining a high accuracy in locating the adjusting member. At the present time, it is required that the driving device be compact in size for improving its mounting property on the vehicle and that the operating speed be high for accommodating changes in operating conditions. Further, recently it has been necessary to adjust the damping force in three or more steps and, accordingly, the driving mechanism is required to have three or more accurate stop positions.

However, the aforesaid reciprocally movable solenoid motor cannot satisfy such requirements since it is difficult to provide simple and reliable stop(s) at intermediate position(s). In the aforesaid rotary actuator, it is relatively difficult to reduce the size, the responsiveness of the geared motor is impaired when the reduction ratio is increased for reducing the size of the motor and, further, the mechanism and the control circuit are complicated. Therefore, prior art devices cannot satisfy the aforementioned requirements.

The present invention has been made in view of the aforesaid circumstances and, the object of the invention is to provide a rotary actuator which attains high accuracy in reliably locating three or more adjusting positions and which can reduce costs.

SUMMARY OF THE INVENTION

According to the invention, the aforesaid object can be attained by a rotary actuator comprising a first rotor rotatable around a first axis and having a plurality of circumferentially spaced and axially projecting first projections, a second rotor rotatable around a second axis which is eccentric to the first axis and having a plurality of circumferentially spaced and axially projecting second projections, and a rotating mechanism being connected to the second rotor to rotate it around the second axis, said second projections projecting in the direction opposite to that of the first projections to cooperate therewith such that either use of the second projections engages with either one of the first projections to rotate the first rotor through a predetermined angle.

According to one preferred embodiment, each of the second projections extends circumferentially by a circumferential length nearly equal to the space between two adjacent first projections.

BRIEF DESCRIPTION OF THE DRAWINGS

Now, the invention will further be described in detail with respect to the preferred embodiments which are particularly adapted for use in a driving device for a damping force adjusting mechanism of a hydraulic damper with reference to the drawings, in which:

FIG. 9 is a sectional view of a hydraulic damper adapted for the embodiment of FIG. 1; and FIG. 10 is a sectional view taken along line X—X in FIG. 9.

DETAILED DESCRIPTION OF THE PREFERRED EMBODIMENTS

Figure 1:
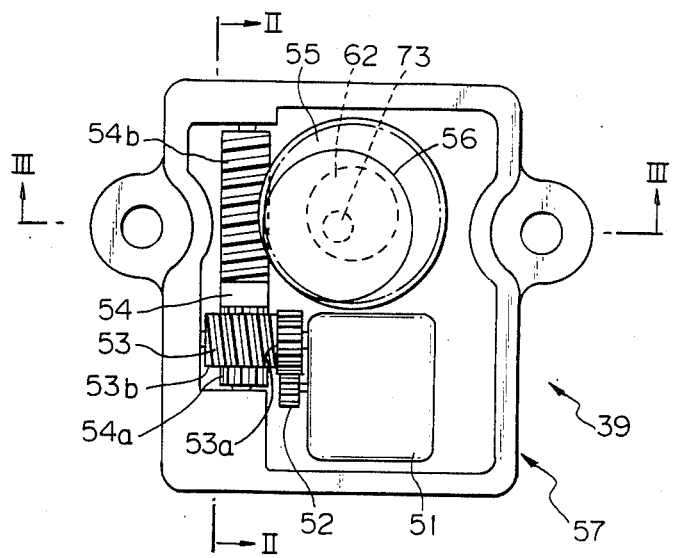
FIG. 1 is a plan view of a preferred embodiment according to the invention.
Figure 2:
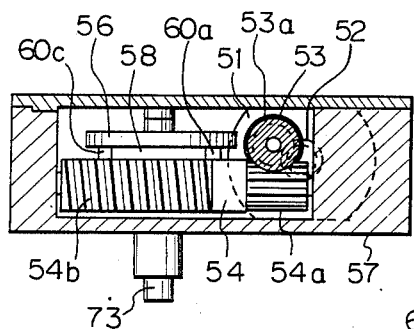
FIG. 2 is a sectional view taken along line II—II in FIG. 1.

In a typical hydraulic damper or shock absorber 97 of adjustable damping force type shown in FIGS. 9 and 10, an inner tube 1 acting as a cylinder is fitted in an outer tube 2, a cap 3 is fixed to one end of the inner tube 1 and one end of the outer tube 2, and a mounting ring 4 is integrally connected to the cap 3 for mounting the hydraulic damper 97 on a wheel axis of vehicle (not shown) and the like. A rod guide 5 and a cap 6 are respectively fitted in the other end of the inner tube 1 and the other end of the outer tube 2, and a piston rod 7 passes through the rod guide 5 and the cap 6 to extend upwardly therefrom. A packing or seal 8 is provided inside of the cap 6 to sealingly abut with the circumferential surface of the rod 7, and the packing 8 is pressed against the inner surface of the cap 6 and the outer circumferential surface of the rod 7 by a spring 10 through a retainer 9 interposed there between. A piston 11 is connected to one end of the rod 7 and is fitted in the inner tube 1 to partition a chamber 12 in the inner tube 1 into two oil chambers 13 and 14. The piston 11 has passages 17 and 18 which are respectively opened and closed by one-way valves 15 and 16 which consist of disc valves. For permanently communicating chambers 13 and 14, a fixed orifice or a passage (not shown) branched from at least one of the passages 17 is provided on the piston 11. Shown at 19 is a washer and, at 20 is a piston ring. The drawing shows only one passage 17 and only one passage 18, but there are provided plural passages 17 and plural passages 18 according to usual practice.

The valve 15 opens when the liquid pressure in the chamber 14 is higher than the liquid pressure in the chamber 13 by a predetermined amount thereby permitting the flow of the liquid through the passage 17 from the chamber 14 to the chamber 13 and, closes when the pressure difference is smaller than the predetermined amount thereby preventing the liquid flow from the chamber 14 to the chamber 13. The valve 16 opens when the liquid pressure in the chamber 13 is higher than a predetermined amount over the liquid pressure in the chamber 14 and, closes when the liquid pressure in the chamber 13 is not larger than the predetermined amount and acts oppositely to the valve 15. An annular chamber 21 defined between the inner tube 1 and the outer tube 2 is communicated with the chamber 14 through an opening 22 formed in one end of the inner tube 1. Oil liquid is contained in the chambers 21, 13 and 14 and inert pressurized gas is enclosed in the upper portion of the chamber 21.

A through hole 23 is formed in the rod 7 to extend longitudinally from the upper end to the lower end of the rod 7 and, a connecting rod 24 rotatably extends through the hole 23. A radial hole 25 is formed in the rod 7 to connect the chamber 13 with the hole 23. Further, a tubular member 26 is screw-threadingly connected to the lower end of the rod 7, and a cap 27 is screw-threadingly connected to the lower end of the tubular member 26. The holes 23 and 25 constitute a liquid passage. The tubular member 26 acts as a nut for connecting the rod 7 to the piston 11.

Figure 4:
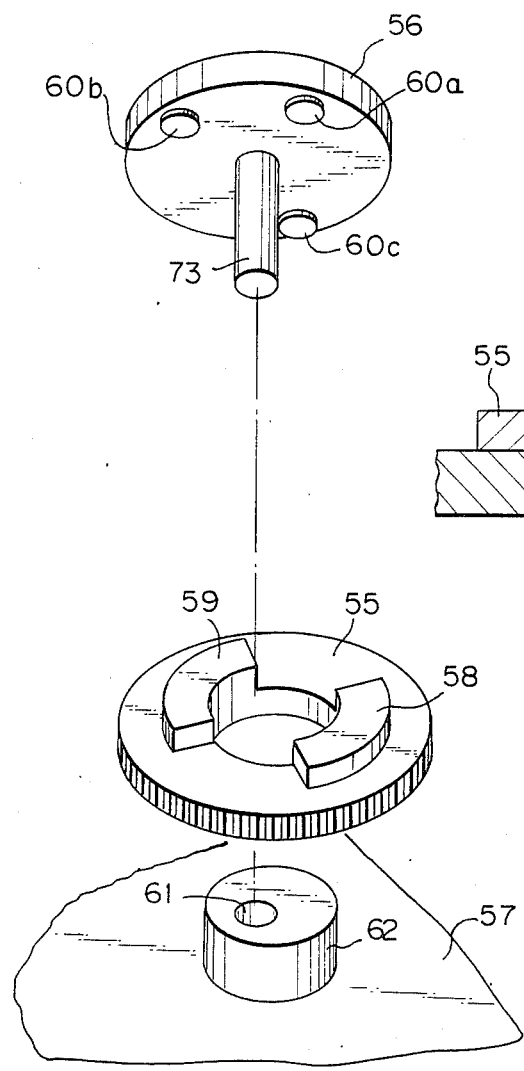
FIG. 4 is an explanatory partially exploded view taken from the embodiment of FIG. 1.

A shutter 29 acting as an opening adjusting member is connected to one end of the connecting rod 24 and is rotatably retained in the tubular member 26. Openings 30, 31 and 32 of different diameters are formed in a side wall of the tubular member 26 and, when the shutter 29 is rotated in the tubular member 26 through the connecting rod 24, the openings 30, 31 and 32 acting as orifices are selectively opened and closed through a hole 34 in the shutter 29. The openings 30, 31 and 32 are formed in the side wall of the tubular member 26 with an angular space of about 120 degrees therebetween respectively. The diameters of the openings 30, 31 and 32 are progressively smaller in the order of openings 32, 31 and 30 respectively. The hole 34 in the shutter 29 extend a predetermined circumferential distance along the side wall of the shutter 29 and, the circumferential distance is smaller than the respective spaces between the openings 30, 31 and 32 and is larger than the diameter of the opening 32. A spring 35 is arranged between the shutter 29 and the cap 27 so that the shutter 29 is urged upwardly by the spring 35. In addition to the hole 34, a hole 36 having a sufficiently large passage area relative to the opening 32 is formed in the shutter 29, whereby the hole 23 is connected to one of the openings 30, 31 or 32 through holes 34 and 36. One end of the rod 7 located outside of the inner tube 1 is mounted to a chassis of a vehicle through a mounting mechanism 37. An O-ring 38 is arranged in the upper end of the hole 23 to prevent leakage of oil liquid from the hole 23. A casing 40 of a rotary actuator 39 acting as a driving device for rotating the connecting rod 24 together with the shutter 29 is mounted on the upper end of the rod 7, and a DC motor 51 is mounted on the casing 40. A pinion gear 52 is secured to the output shaft of the motor 51 and, the pinion gear 52 meshes with a gear portion 53a of a gear wheel 53 to transmit the rotation of the pinion gear 52 to the gear wheel 53. A worm gear portion 53b is also provided on the gear wheel 53 which engages with a worm wheel portion 54a of a gear wheel 54. The rotation of the worm wheel portion 54a is transmitted through the rotation of worm gear portion 54b to a worm wheel 55 which acts as a second rotor according to the invention. The motor 51, the pinion gear 52 and gear wheels 53 and 54 constitute a rotating mechanism which is connected to the second rotor i.e. worm wheel 55 which rotates around a central axis thereof. The worm wheel 55 is rotatable about the side surface of a cylindrical projection 62 which is provided on a housing 57 with the side surface thereof acting as a sliding or bearing surface (refer to FIG. 4). A cylindrical hole 61 having a central axis thereof spaced from and parallel to the central axis of the second rotor, i.e. the worm wheel 55 is formed in the cylindrical projection 62, and the cylindrical hole 61 receives an output shaft 73 of a pin wheel 56 which is located above the worm wheel 55. As shown in the drawings, the axis of rotation of the worm wheel 55 is eccentric to or in other words not coincident with but rather parallel to and offset from the axis of rotation of the pin wheel 56 which constitutes a first rotor according to the invention such that the rotation of the first and second rotors are eccentric to each other. There are provided pins 60a, 60b and 60c acting as projections on one axial end surface of the pin wheel 56 opposing or facing the worm wheel 55 and the pins are equally spaced along the circumference of an imaginary circle having a center coinciding with the axis of rotation of the pin wheel 56. The pins 60a, 60b and 60c are rotatable in a first path and engage with and disengage from arcuate projections 58 and 59 formed on an axial end surface of the worm wheel 55 facing the pin wheel 56 when the worm wheel 55 is rotated, whereby the projections are rotated in a second path.

Figure 3:
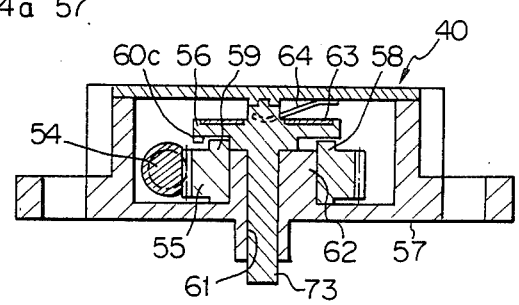
FIG. 3 is a sectional view taken along line III—III in FIG. 1.
Figure 5:
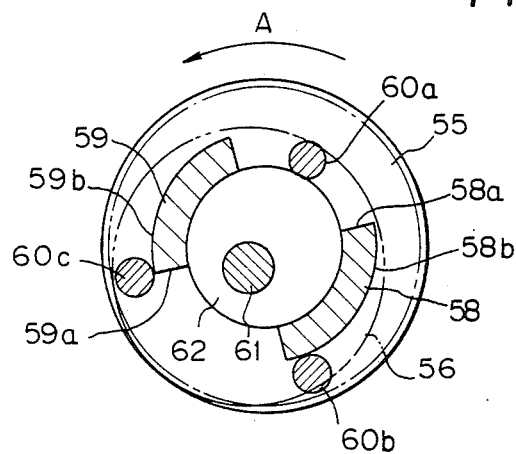
FIG. 5 is an explanatory view showing the relationship between the pin, pin wheel and worm wheel shown in FIG. 1.
Figure 6:
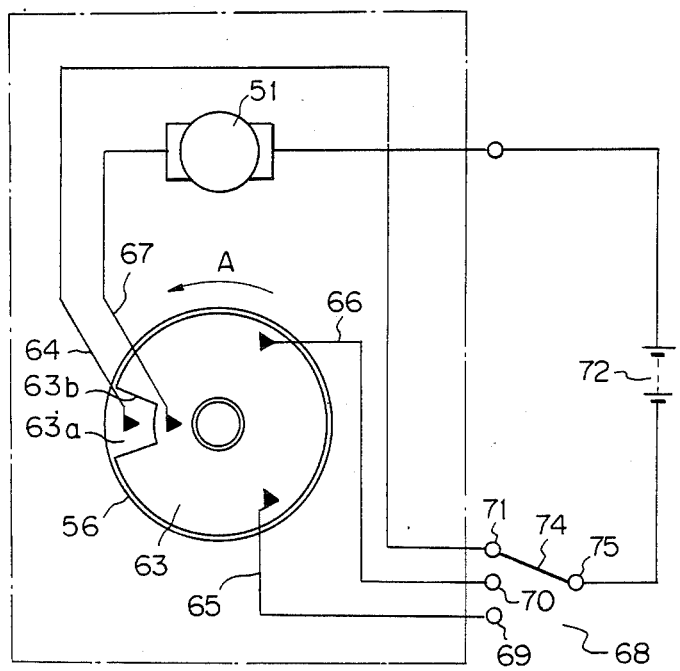
FIG. 6 is a diagram of an electric control circuit of the embodiment of FIG. 1.

As shown in FIG. 3 and FIG. 6, an electrically conductive member, such as a plate 63, having a non-conductive portion, such as a cutout portion 63a in the plate 63 is mounted on the upper surface of the pin wheel 56, and brushes or electrical spring contacts 64, 65, 66 and 67 extend from the housing 57 to the plate 63 at the predetermined positional relationships shown in FIG. 6. The positional relationship between the plate 63 and brushes 64, 65 and 66 is such that when the worm wheel 55 is rotated to an angular position at which the arcuate projections 58 and 59 on the worm wheel 55 do not drivingly engage with any of the pins 60a, 60b and 60c of the pin wheel 56 as shown in FIG. 5, one of the brushes 64, 65 and 66 is located in the cutout portion 63a of the conductive plate 63 as shown in FIG. 6. The brush 67 is permanently in electrical contact with the conductive plate 63 and with one terminal of the motor 51. The brushes 64, 65 and 66 are respectively connected with contact points 71, 69 and 70, and are connected to a contact point 75 by means of a movable contact piece 74 of a selector switch 68. Shown at numeral 72 is a battery in series with the contact point 75 and the DC motor 51. The output shaft 73 integrally formed with the pin wheel 56 is connected to the connecting rod 24 of the hydraulic damper 97 and, when the pin wheel 56 is rotated through the engagement between one of the arcuate projections 58 and 59 with one of pins 60a, 60b and 60c along a portion of the first path, the output shaft 73 is rotated and, the shutter 29 rotates in the same direction through the connecting rod 24. The switch 68 is mounted on an operating panel in driver's compartment of the vehicle to which the hydraulic damper 97 is mounted. The contact point 75 of the selector switch 68 is connected to one of the terminals of the battery 72 and another terminal of the battery 72 is connected to another terminal of the motor 51.

In the hydraulic damper 97 having the rotary actuator 39 which is constituted as described heretofore, when the switch 68 is connected to the contact point 71 and the cutout portion 63a is located at the position of FIG. 6, the communication between the brushes 64 and 67 is prevented, as a result, no electric current flows through the motor 51 from the battery 72, thus, the pinion gear 52, gear wheels 53 and 54, the worm wheel 55, pin wheel 56, the connecting rod 24 and the shutter 29 are maintained standstill, and the opening 34 of the shutter 29 aligns with the orifice opening 30 in the tubular member 26, thus, the chambers 13 and 14 are communicated through holes 25, 23 and 36 and the openings 34 and 30. The hydralic damper 97 generates a damping force, in the extension stroke shown by direction G in FIG. 9, as defined by the fixed orifice formed in the piston 11, the valve 16 and the opening 30. The diameter of the opening 30 is small as compared with the opening 32 or 31, thus, the hydraulic damper generates the strongest damping force. Also, in the contraction stroke or in the movement of the piston 11 in the direction H, the strongest damping force is generated.

Next, when the switch 68 is operated to contact the movable contact piece 74 with the contact point 70, the battery 72 supplies the electric current through the brush 66 and the conductive plate 63, and through the brush 67 to the motor 51, thus, the motor 51 rotates to rotate the pinion gear 53, and the worm wheel 55 rotates in the A-direction shown in FIG. 5, then, an end surface 58a of the arcuate projection 58 abuts with the pin 60a on the pin wheel 56 and the pin wheel 56 also rotates in the A-direction. When the pin 60a takes the position of the pin 60c of FIG. 5, or rotates by ⅓ turns, the engagement between the arcuate projection 58 and the pin 60a is released, and the rotation of the pin wheel 56 stops. At that time, the arcuate projection 58 on the worm wheel 55 and the pin 60a of the pin wheel 56 are respectively rotated to the positions of arcuate projection 59 and the pin 60c in FIG. 5. The cutout portion 63a of the conductive plate 63 provided on the opposite side of the pin wheel 56 displaces to break contact of the brush 66 with the conductive plate 63, and the supply of the electric current to the motor 51 from the battery 72 is intercepted, thereby stopping the motor 51. By the displacement of the cutout portion 63a, the opening 34 of the shutter 29 is set to a condition aligning with the orifice opening 31, so that the chambers 13 and 14 are communicated through holes 25, 23 and 36 and openings 34 and 31, thus, the hydraulic damper 97 acts to generate an intermediate damping force or a medium damping force during the displacement of the piston 11 in G- and H-directions, since the orifice opening 31 has the second largest diameter of the openings 30, 31 and 32.

Further, when the switch 68 is switched from the contact point 70 to the contact point 69, the end surface 59a of the arcuate projection 59 engages with the pin 60b, and the worm wheel 55 rotates the pin wheel 56 by about ⅓ turns. It will be noted that, in the initial condition, the arcuate projection 59 takes the location of the projection 58 in FIG. 5 and the pin 60b takes the location of the pin 60a in FIG. 5 and, in the final condition, the arcuate projection 59 takes the same location shown in FIG. 5 and the pin 60b takes the location of the pin 60c in FIG. 5. Thus, the hole 34 in shutter 29 aligns with the largest orifice opening 32 which acts to define the minimum damping force or a predetermined soft condition.

In the rotary actuator 39, pins 60a, 60b and 60c are mounted on the pin wheel 56 and, arcuate projections 58 and 59 are mounted on the worm wheel 55 to engage with one of the pins 60a, 60b and 60c thereby transmitting the rotation from the worm wheel 55 to the pin wheel 56, thus, when arcuate projections 58 and 59 are disengaged from pins 60a, 60b and 60c, the rotating force is not transmitted from the worm wheel 55 to the pin wheel 56, as a result even if the worm wheel 55 would rotate by some amount due to the inertia of a rotor of the motor 51 and the like the pin wheel 56 does not rotate. Accordingly, it is possible to align the opening 34 in the shutter 29 with a desired opening 30, 31 or 32 with very high accuracy. Further, when the pin 60a, 60b or 60c is disengaging with the arcuate projection 58 or 59 as shown in FIG. 5, a radially outer arcuate wall 58b or 59b of one of the projections 58 or 59 on the pin wheel 56 contacts with wall of one of the poins 60a, 60b or 60c, thus, when the worm wheel 55 is standstill, the rotation of the pin wheel 56 is stopped due to the retaining force of the mutual contact, thereby the shutter 29 is reliably retained at desired angular position. Further, since the conductive plate 63 having the cutout portion 63a is mounted on the pin wheel 56 and brushes 64, 65, 66 and 67 for contacting with the conductive plate 63 are mounted on the casing 40, and the conductive plate 63, the brushes 64, 65, 66 and 67 and the motor 52 are connected in series relative to the battery 72, it is possible to simplify the control circuit for the motor 51, and to actuate and to inactuate the motor 51 by simply operating the switch 68.

Figure 7A:
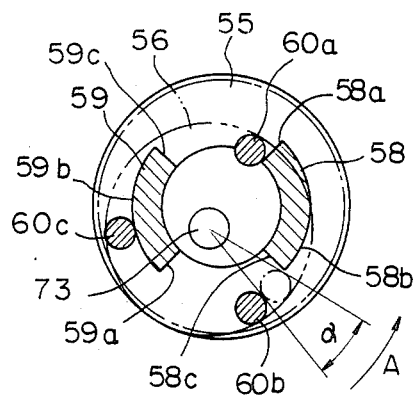
FIGS. 7a and 7b are explanatory views corresponding respectively to FIG. 5 and a part of FIG. 6.
Figure 7B:
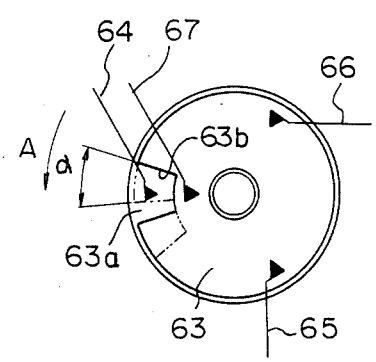
Figure 8A:
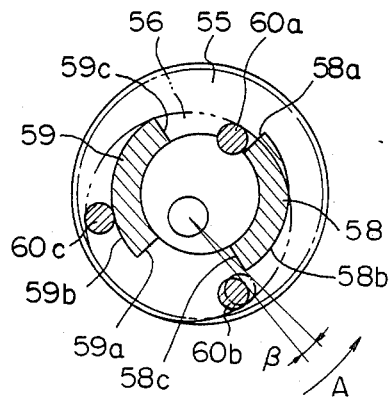
FIGS. 8a and 8b are views similar to FIGS. 7a and 7b, but showing a second embodiment according to the invention.
Figure 8B:
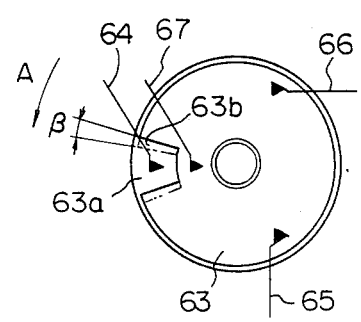

FIGS. 8a and 8b show a second embodiment of the invention, while FIGS. 7a and 7b which are similar to FIG. 5 and a part of FIG. 6 respectively show a first embodiment according to the invention. In the first embodiment, when the motor 51 rotates the worm wheel 55 further in the arrow A direction from the condition shown in FIG. 5 to the condition shown in FIG. 7a, an angular clearance α is formed between the pin 60b and an end surface 58c of the arcuate projection 58, which clearance permits the rotation of the pin wheel 56, thus, deteriorates the accuracy in angularly locating the shutter 29. Further, as shown in FIG. 7b, the brush 64 may contact edge portion 63b of the cutout 63a in the conductive plate 63 whereby electric current is supplied to the motor 51, and the shutter 29 is further rotated.

As shown in FIG. 8a, according to the second embodiment of the invention, the arcuate length of arcuate projections 58 and 59 are extended to the length nearly equal to arcuate space between adjacent two pins. When the end surface 58a of the arcuate projection 58 engages with the pin 60a, another end surface 58c of the projection 58 makes a small clearance β between the pin 60b. Further, as shown in FIG. 8b, the angular clearance β is sufficiently small whereby the brush 64 is prevented from contacting with the end portion 63b of the cutout 63a in the conductive plate 63.

Incidentally, in the embodiments, the conductive plate 63 is mounted on the pin wheel 56 and brushes 64, 65, 66 and 67 are mounted on the casing 40, but the invention is not limited thereto. For example, the brushes 64, 65, 66 and 67 may be mounted on the pin wheel 56 with the conductive plate 63 being mounted on the casing 40. Further, the invention may be applied to various appliances other than the driving device for a damping force generating mechanism of a hydraulic damper.

Figure 11:
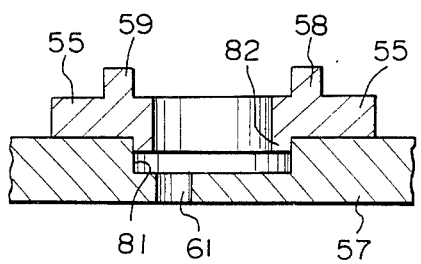
FIG. 11 is a sectional view similar to a part of FIG. 3, but showing a modified form.

Further, in the aforesaid embodiment, the connection between the housing 57 and the worm wheel 55 is made through the cylindrical projection 62, however, as shown in FIG. 11, an annular groove 81 may be provided in the housing 57 for receiving a cylindrical projection 82 formed on the worm wheel 55.

As described heretofore, according to the invention, it is possible to present unnecessary rotation of a motor due to the inertia of the rotor and the like from interfering with the accuracy of a control circuit. Thus, it is possible simplify a control circuit by providing the conductive plate of the present invention thereby reducing substantially the cost thereof while maintaining high accuracy.

What is claimed is:

1. A rotary actuator comprising a first rotor rotatable around a first axis and having an axial end surface with a plurality of circumferentially spaced and axially projecting first projections extending from said axial end surface, a second rotor rotatable around a second axis which is not coincident with said first axis, said second rotor having an axisl end surface with a plurality of circumferentially spaced and axially projecting second projections extending from said axial end surface thereof, and a rotating mechanism being connected to said second rotor to rotate said second rotor around said second axis, said second projections projecting in a direction opposite to that of said first projections and engageable therewith whereby one of said second projections engages with one of said first projections to rotate said first rotor through a predetermined angular rotation when said second rotor is rotated by said rotating mechanism.

2. A rotary actuator according to claim 1, wherein each of said second projections extends circumferentially by a circumferential length nearly equal to but less than a circumferential space between an adjacent two of said first projections.

3. A rotary actuator comprising:
a first rotor rotatable around a first axis and having on one end surface thereof a plurality of circumferentially spaced and axially projecting first projections;
a second rotor rotatable around a second axis which is eccentric to the first axis and having on one end surface which faces the one end surface of the first rotor a plurality of circumferentially spaced and axially projecting second projections, each of said second projections being selectively engageable with said first projections and adapted to disengage therewith at a predetermined position, whereby said first rotor is rotated by a predetermined angular rotation;
an electrically powered rotating mechanism connected to said second rotor to rotate said second rotor around said second axis;
an electric circuit means connected to said rotating mechanism;
a member of electrically conductive material having an electrically non-conductive portion and being adapted to rotate in unison with said first rotor;
a first brush connected to said electric circuit means and adapted to contact with said member along a path which does not pass through said non-conductive portion;
a plurality of second brushes selectively connected to said circuit means and adapted to contact with said member along paths which pass through said non-conductive portion;
said first rotor being rotated by said predetermined angular rotation by engagement of one of said first projections with one of said second projections when a selected one of said second brushes which is out of contact with said non-conductive portion is connected to said circuit means so as to energize said rotating mechanism;
said non-conductive portion being located such that said selected one of said second brushes contacts with said non-conductive portion to break said circuit means when said engagement between a respective one of said first projections and a respective one of said second projections is released at said predetermined position.

4. A rotary actuator according to claim 3, wherein each of said second projections extends circumferentially by a circumferential length nearly equal to the space between adjacent two first projections.

5. A rotary actuator comprising:
a first rotor rotatable around a first axis and having on one end surface thereof a plurality of circumferentially spaced and axially projecting first projections which are rotatable in a first path;
a second rotor rotatable around a second axis which is not coincident with said first axis and having on one end surface which faces said one end surface of said first rotor a plurality of circumferentially spaced and axially projecting second projections, each of said second projections being rotatable in a second path and selectively engageable with and rotatable with one of said first projections over a portion of said first path and over a portion of said second path and adapted to disengage therewith at a predetermined angular position along said first path and said second path, whereby said first rotor is rotated by a predetermined angular rotation around said first path each time a respective first projection is rotated over said portion of said first path by engagement with a respective one of said second projections which is rotated over said portion of said second path;
an electrically powered rotating mechanism connected to said second rotor for rotation of said second rotor around said second axis;
an electric circuit means connected to said rotating mechanism for supplying electrical power to said rotating mechanism and cause rotation of said second rotor;
a member of electrically conductive material having at least one electrically non-conductive portion, said member being fixed to and rotatable in unison with said first rotor;
a first brush electrically connected to said electric circuit means, said first brush being in sliding contact with said member along a path which does not pass through said non-conductive portion;
a plurality of second brushes selectively electrically connected to said electric circuit means by suitable switching means, each of said plurality of second brushes being in sliding contact with said member along a path which passes through said non-conductive portion;
said first rotor being rotated by said predetermined angular rotation by engagement of one of said first projections thereof with one of said second projection of said second rotor when a selected one of said second brushes which is not in contact with said non-conductive portion is connected to said circuit means so as to energize said rotating mechanism;

said non-conductive portion of said member being located such that said selected one of said second brushes contacts with said non-conductive portion to interrupt the supply of electrical power from said circuit means to said rotating mechanism when said engagement between a respective one of said first projections and a respective one of said second projections is released at said predetermined angular position.

6. The rotary actuator of claim 5, wherein each of said second projections extends circumferentially along said second path a length nearly equal to but less than a circumferential length between two adjacent said first projections.

7. The rotary actuator of claim 5, wherein said member comprises a plate and said at least one electrically non-conductive portion thereof comprises at least one cut-out in said plate.

8. The rotary actuator of claim 5, wherein said member has a single said electrical non-conductive portion.

9. The rotary actuator of claim 7, wherein said electrically non-conductive portion comprises a single cut-out in said plate.

10. The rotary actuator of claim 5, further including a housing containing said first rotor and said second rotor.

11. The rotary actuator of claim 10, wherein said first brush and said plurality of second brushes are fixedly secured to said housing.

12. The rotary actuator of claim 5, wherein said first axis is parallel to said second axis.

* * * * *